United States Patent
Shen

(10) Patent No.: US 9,503,230 B2
(45) Date of Patent: Nov. 22, 2016

(54) METHOD AND SYSTEM FOR IMPLEMENTING SYNCHRONOUS PARALLEL TRANSMISSION OVER MULTIPLE CHANNELS

(75) Inventor: Chengke Shen, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 63 days.

(21) Appl. No.: 14/386,733

(22) PCT Filed: Mar. 28, 2012

(86) PCT No.: PCT/CN2012/073208
§ 371 (c)(1),
(2), (4) Date: Sep. 19, 2014

(87) PCT Pub. No.: WO2013/143090
PCT Pub. Date: Oct. 3, 2013

(65) Prior Publication Data
US 2015/0092792 A1    Apr. 2, 2015

(51) Int. Cl.
*H04L 5/00*  (2006.01)
*H04L 12/933*  (2013.01)
*H04J 13/00*  (2011.01)
*H04L 7/00*  (2006.01)

(52) U.S. Cl.
CPC ............. *H04L 5/0021* (2013.01); *H04J 13/00* (2013.01); *H04J 13/0003* (2013.01); *H04J 13/0048* (2013.01); *H04L 7/0091* (2013.01); *H04L 49/109* (2013.01); *H04L 49/1523* (2013.01)

(58) Field of Classification Search
CPC .................................................. H04L 5/0021
See application file for complete search history.

(56) References Cited

U.S. PATENT DOCUMENTS

| 7,697,563 | B2 | 4/2010 | Sobelman |
| 8,363,538 | B2 * | 1/2013 | Bois ................. H04J 13/0003 370/209 |

(Continued)

FOREIGN PATENT DOCUMENTS

| CN | 101141261 A | 3/2008 |
| CN | 101425966 A | 5/2009 |

(Continued)

OTHER PUBLICATIONS

International Search Report in international application No. PCT/CN2012/073208, mailed on Jan. 10, 2013.

(Continued)

*Primary Examiner* — Jason Mattis
(74) *Attorney, Agent, or Firm* — Oppedahl Patent Law Firm LLC

(57) ABSTRACT

Disclosed are a method and a system for implementing synchronous parallel transmission over multiple channels. The method comprises: a sending end and a receiving end accessing an NoC through a sending port and a receiving port on the NoC, the sending port and the receiving port having a capability of simultaneously and parallelly transmitting data; the sending end sending data to the sending port of the NoC, and the sending port encoding the received data into a bipolar data symbol and modulating the bipolar data symbol by using a Walsh code; then the NoC synchronously adding and combining modulated symbols of all sending ports, and sending a signal after the combination to each receiving port through an NoC bus synchronously and parallelly; and the receiving port demodulating the received combined data according to the Walsh code thereof to obtain the bipolar data symbol, and then decoding the bipolar data symbol and sending the decoded bipolar data symbol to the receiving end. The present invention implements the synchronous parallel transmission over multiple channels, and one or more channels can be dynamically allocated to each NoC port so as to adapt to different communication bandwidth requirements.

14 Claims, 7 Drawing Sheets

(56) References Cited

U.S. PATENT DOCUMENTS

| | | | |
|---|---|---|---|
| 2004/0110519 A1* | 6/2004 | Chang | H04B 5/02 455/502 |
| 2005/0185642 A1* | 8/2005 | Rhim | G06F 15/16 370/389 |
| 2006/0153190 A1* | 7/2006 | Kim | H04L 12/4625 370/389 |
| 2006/0187953 A1 | 8/2006 | Sobelman | |
| 2009/0109996 A1 | 4/2009 | Hoover | |
| 2009/0245257 A1 | 10/2009 | Comparan | |
| 2011/0018145 A1 | 1/2011 | Salama | |
| 2011/0069770 A1* | 3/2011 | Sobelman | H04B 1/707 375/260 |
| 2011/0181450 A1 | 7/2011 | Feng | |

FOREIGN PATENT DOCUMENTS

| | | |
|---|---|---|
| JP | 2002246544 A | 8/2002 |
| JP | 2003218835 A | 7/2003 |
| JP | 2006157933 A | 6/2006 |
| JP | 2006191648 A | 7/2006 |

OTHER PUBLICATIONS

English Translation of the Written Opinion of the International Search Authority in international application No. PCT/CN2012/073208, mailed on Jan. 10, 2013.

Supplementary European Search Report in European application No. 12872794.8, mailed on Feb. 16, 2015.

* cited by examiner

METHOD AND SYSTEM FOR IMPLEMENTING SYNCHRONOUS PARALLEL TRANSMISSION OVER MULTIPLE CHANNELS

TECHNICAL FIELD

The disclosure relates to the field of communication, and in particular to a method and system for implementing synchronous parallel transmission over multiple channels.

BACKGROUND

At present, a capability of synchronous parallel transmission of data over multiple channels in a Code Division Multiple Access Network on Chip (CDMA-NoC) system based on bipolar encoding of data is mentioned gradually, but no relevant technique has appeared so far.

SUMMARY

In view of the above, it is desired that embodiments of the disclosure provide a method and system for implementing synchronous parallel transmission over multiple channels, capable of implementing synchronous parallel transmission over multiple channels.

To this end, a technical solution of the disclosure is implemented as follows.

A method for implementing synchronous parallel transmission over multiple channels includes steps of:

accessing, by a transmitting end and a receiving end, a Network on Chip (NoC) through a transmitting port and a receiving port on the NoC, wherein the transmitting port and the receiving port serve for simultaneous parallel data transmission;

transmitting, by the transmitting end, data to the transmitting port of the NoC; encoding, by the transmitting port, the received data into a bipolar data symbol, and modulating the bipolar data symbol using a Walsh code; and mixing, by the NoC, symbols modulated by all transmitting ports by synchronously summing over the symbols modulated by all the transmitting ports, and transmitting a mixed signal to each receiving port via a bus of the NoC in parallel synchronously;

demodulating, by a receiving port, received mixed data to obtain the bipolar data symbol according to a Walsh code of the receiving port, decoding the bipolar data symbol, and transmitting the decoded data to a receiving end.

In an embodiment, when transmitting data, a transmitting end may transmit N-bit wide binary data to a port modulator of the NoC; and a receiving port may receive N-bit wide binary data from a receiving end;

the port modulator may include K code channel modulators; and outputs of the K code channel modulators of the port modulator may be merged and then connected to a bus within the NoC via a port merger;

the signal from a bus of the NoC may be transmitted in parallel to K code channel demodulators of a port demodulator of the NoC, and data demodulated by the K code channel demodulators may be synthesized into one stream of data by parallel-to-serial conversion.

In an embodiment, each of the code channel modulators may convert the N-bit data from a transmitting end into an (N+1)-bit bipolar data symbol through an encoder, and modulate the (N+1)-bit bipolar data symbol by a given bipolar Walsh code, such that the modulation turns each bit of the bipolar data symbol into L chips; and then Q chips of the L chips may be transmitted in parallel.

In an embodiment, in modulation of the (N+1)-bit bipolar data symbol, a symbol modulator in a code channel modulator may divide the (N+1)-bit bipolar data symbol into two streams, negate one of the two streams, and then connect the two streams to a multiplexer; each bit of the bipolar data symbol may be modulated into L chips through the multiplexer by a given Walsh code; an output of the multiplexer may be taken as an input bipolar data symbol bit it self when a chip corresponding to the output is +1, or otherwise an output of the multiplexer may be taken as the negation of an input bipolar data symbol bit when a chip corresponding to the output is −1.

In an embodiment, when the outputs of the K code channel modulators of the port modulator are merged and then connected to a bus within the NoC via the port merger, the port merger may mix modulated signals from all the transmitting ports, transmit the mixed signal to a bus within the NoC, and to all port demodulators via the bus.

In an embodiment, when receiving the signal from a bus of the NoC, a code channel demodulator may perform an negation operation of the code channel demodulator;

after the mixed signal from a system bus within the NoC passes through the code channel demodulator, a clock of user data with the orthogonal code removed may be a peripheral clock.

In an embodiment, a symbol demodulator in a code channel modulator may divide an input signal into two signals, negate one of the two signals, transmit the two signals to an accumulator through a multiplexer controlled by an orthogonal code, trigger accumulation of L chips corresponding to one bit of user data by the accumulator, and then restore the bit of the user data by dividing a result of the accumulation by L.

In an embodiment, the Walsh code may be uniquely specified by a destination address of the transmitting port, and each receiving port may be specified by a unique Walsh code.

A system for implementing synchronous parallel transmission over multiple channels includes a Network on Chip (NoC) configured with a transmitting port and a receiving port serving for simultaneous parallel data transmission, where the transmitting port and the receiving port are configured for access of the NoC by a transmitting end and a receiving end;

the transmitting port is configured to receive data transmitted by the transmitting end to the NoC, encode the received data into a bipolar data symbol, and modulate the bipolar data symbol using a Walsh code;

the NoC is configured to mix symbols modulated by all transmitting ports by synchronously summing over the symbols modulated by all the transmitting ports, and transmit a mixed signal to each receiving port via a bus of the NoC in parallel synchronously; and a receiving port is configured to demodulate received mixed data to obtain the bipolar data symbol according to a Walsh code of the receiving port, decode the bipolar data symbol, and transmit the decoded data to a receiving end.

In an embodiment, a transmitting end may be configured to: when transmitting data, transmit N-bit wide binary data to a port modulator of the NoC; and a receiving port may be configured to receive N-bit wide binary data from a receiving end;

the port modulator may include K code channel modulators; and outputs of the K code channel modulators of the port modulator may be merged and then connected to a bus within the NoC via a port merger;

the signal from a bus of the NoC may be transmitted in parallel to K code channel demodulators of a port demodulator of the NoC, and data demodulated by the K code channel demodulators may be synthesized into one stream of data by parallel-to-serial conversion.

In an embodiment, each of the code channel modulators may be configured to convert the N-bit data from a transmitting end into an (N+1)-bit bipolar data symbol through an encoder, and modulate the (N+1)-bit bipolar data symbol by a given bipolar Walsh code, such that the modulation turns each bit of the bipolar data symbol into L chips, wherein Q chips of the L chips may then be transmitted in parallel.

In an embodiment, each code channel modulator may include a symbol modulator configured to: in modulation of the (N+1)-bit bipolar data symbol, divide the (N+1)-bit bipolar data symbol into two streams, negate one of the two streams, connect the two streams to a multiplexer to modulate each bit of the bipolar data symbol into L chips through the multiplexer by a given Walsh code, where an output of the multiplexer may be taken as an input bipolar data symbol bit it self when a chip corresponding to the output is +1, or otherwise an output of the multiplexer may be taken as the negation of an input bipolar data symbol bit when a chip corresponding to the output is −1.

In an embodiment, the port merger may be configured to: when the outputs of the K code channel modulators of the port modulator are merged and then connected to a bus within the NoC via the port merger, mix modulated signals from all the transmitting ports, transmit the mixed signal to a bus within the NoC, and to all port demodulators via the bus.

In an embodiment, a code channel demodulator may be configured to: when receiving the signal from a bus of the NoC, perform an negation operation of the code channel demodulator, where after the mixed signal from a system bus within the NoC passes through the code channel demodulator, a clock of user data with the orthogonal code removed may be a peripheral clock.

In an embodiment, each code channel modulator may include a symbol demodulator configured to divide an input signal into two signals, negate one of the two signals, transmit the two signals to an accumulator through a multiplexer controlled by an orthogonal code, trigger accumulation of L chips corresponding to one bit of user data by the accumulator, and then restore the bit of the user data by dividing a result of the accumulation by L.

In an embodiment, the Walsh code may be uniquely specified by a destination address of the transmitting port, and each receiving port may be specified by a unique Walsh code.

Disclosed herein is a multi-channel synchronous parallel transmission network implemented for reconfigurable multi-core processor clusters. A number of processor clusters can form dynamically in the multi-core system as needed. Cores belonging to two different clusters on a same network are isolated from each other completely; communications among all cores within a same cluster are performed in parallel synchronously completely, i.e., with synchronous parallel transmission over multiple channels; and each NoC port can be dynamically allocated with one or more channels to adapt to different requirements on a communication bandwidth.

DETAILED DESCRIPTION

In a multi-core processor or a multi-core array (or vector) processor, especially in a reconfigurable multi-core array (or vector) processing cluster system, an inter-core communication network is usually required to provide a capability of synchronous parallel communication over multiple channels. For example, in a reconfigurable array processing cluster, multiple array (or vector) processing cores will be dynamically reconfigured into a processor cluster; and there will be multiple such processor clusters co-existing in a System on Chip (SoC). In this case, synchronous parallel data exchange between all array cores located in one cluster has to be performed simultaneously. However, different clusters are isolated from each other completely. That is to say, an NoC must be featured as such, that:

cores belonging to two different clusters on a same network are isolated from each other completely;

communications among all cores within a same cluster are performed in parallel synchronously completely, i.e., with synchronous parallel transmission over multiple channels; and transmission delay of each channel is identical; and dynamic reconfiguration is implemented, i.e., each NoC port can be dynamically allocated with one or more channels to adapt to different requirements on a communication bandwidth.

The disclosure describes a CDMA NoC system based on bipolar encoding of data. Any data transmitting end and receiving end access the NoC through a transmitting (TX) port and a receiving (RX) port on the NoC. Data transmission and exchange can be performed in parallel simultaneously among such TX ports and RX ports. Any TX port with data to be transmitted first encodes the data into a bipolar data symbol; then the bipolar data symbol are further modulated by an orthogonal Walsh code used as an address, and are transmitted in parallel synchronously onto the NoC. Symbols modulated at TX ports are mixed and then transmitted (e.g., broadcasted) to all RX ports. Each receiving port demodulates received mixed data to obtain a data symbol of the receiving port per se according to a Walsh code specified for the receiving port per se, thereby achieving synchronous parallel exchange and transmission among multiple ports. Such technical content may apply widely to multi-core chips such as a multi-core processor, a multi-core DSP, a multi-core parallel array processor and the like to implement large scale, broadband parallel inter-core communication.

Figure 1:
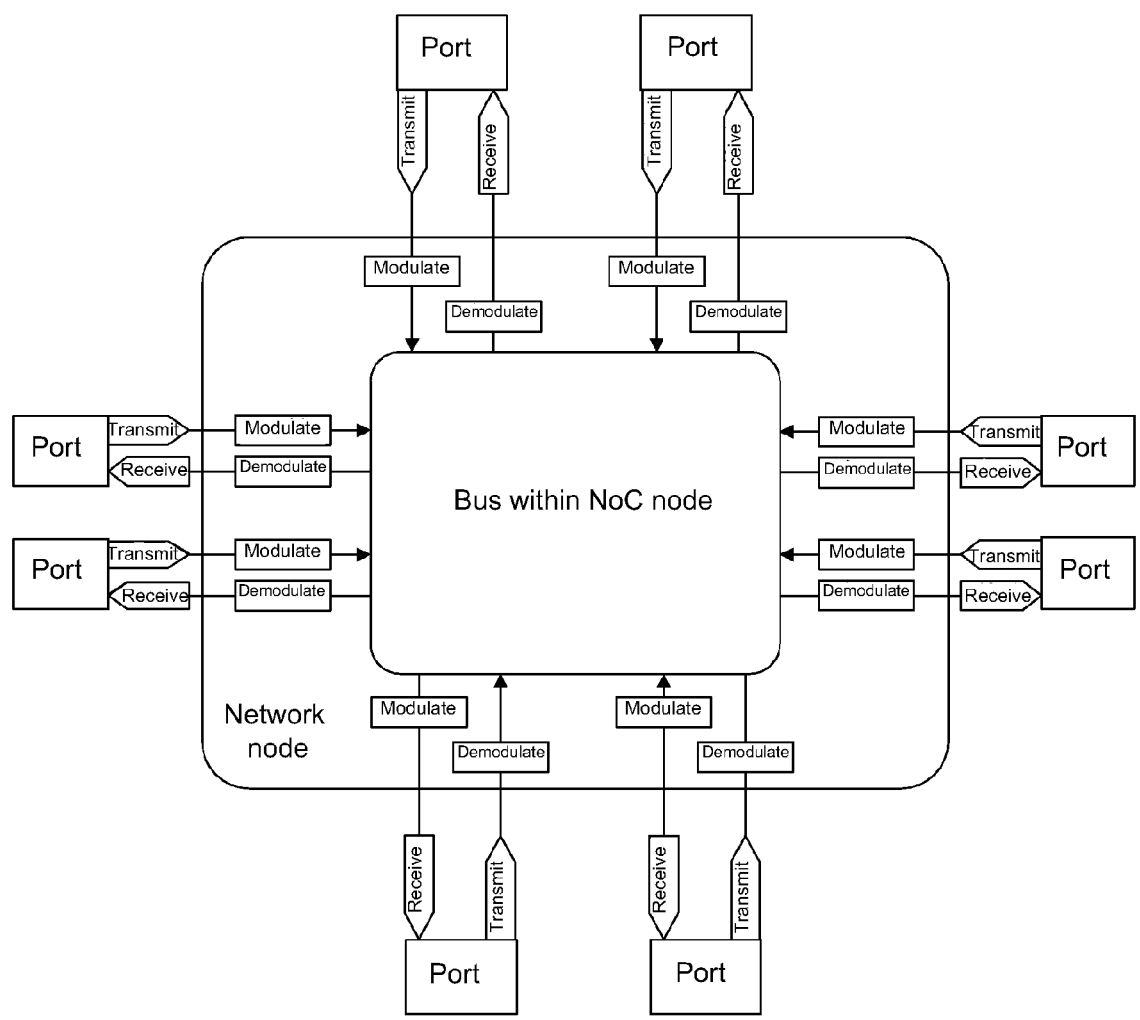
FIG. 1 is a schematic diagram of a structure of a CDMA NoC based on data symbol bipolar encoding according to an embodiment of the disclosure.

In an embodiment, a structure of a CDMA NoC based on data symbol bipolar encoding is as shown in FIG. 1. The NoC consists of an NoC node and peripheral ports. Each port includes a transmitting port and a receiving port. Each transmitting port accesses the NoC through an NoC CDMA modulator, while each receiving port accesses the NoC through a demodulator. All the modulators and demodulators are connected to buses within the NoC.

A codebase of Walsh codes is defined. The length of each Walsh code in the codebase is L chips, where L may be any integer. All Walsh codes in the codebase must be completely orthogonal to each other. Therefore, a codebase with a code length of L may provide at most L orthogonal codes. A CDMA NoC with data symbol bipolar encoding having L Walsh codes will support at most access by L ports.

Figure 2:
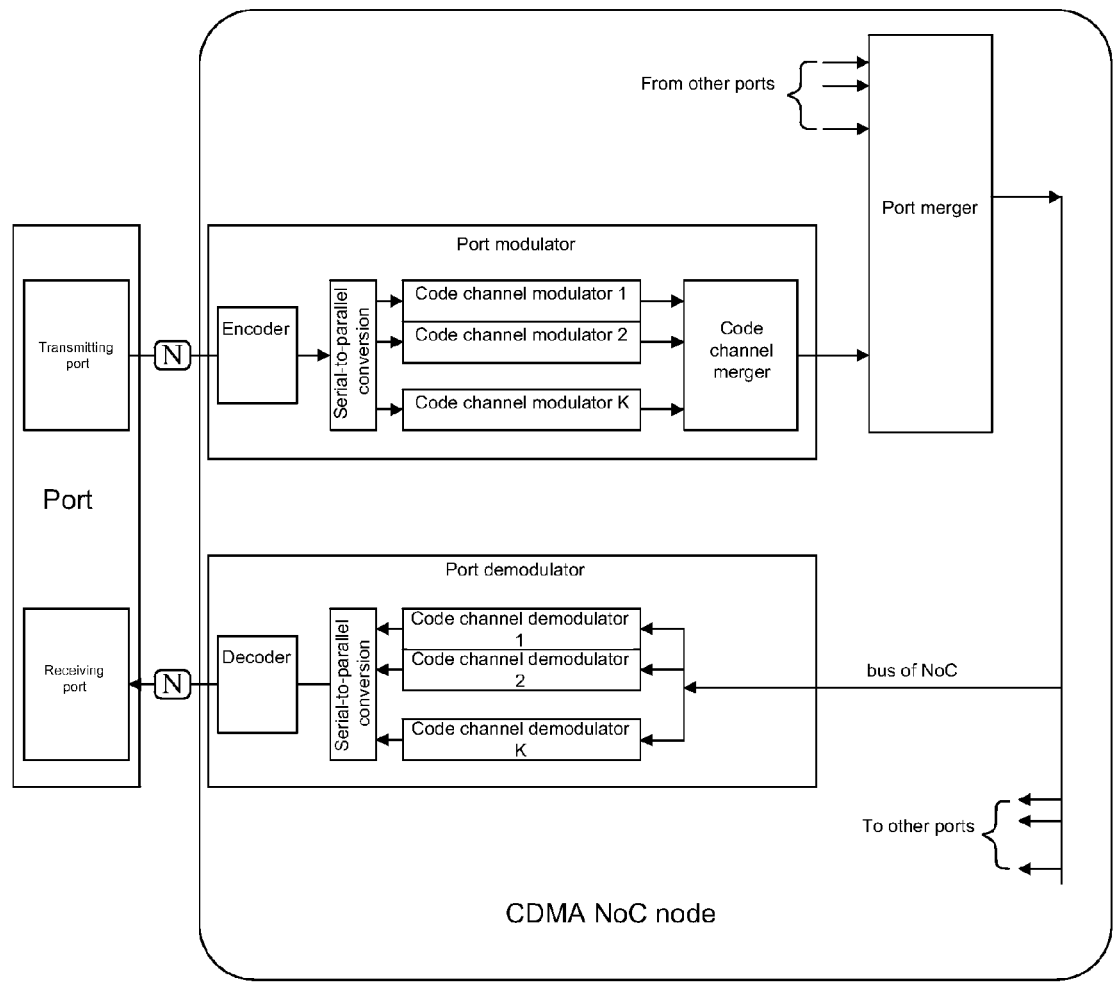
FIG. 2 is a schematic diagram of a structure of a port modulator (MoD) and a port demodulator (deMoD) according to an embodiment of the disclosure.

FIG. 2 gives the structure of a port MoD and a port deMoD. Each transmitting port transmits N-bit wide binary data to a port modulator of the NoC. Each receiving port receives N-bit wide binary data from the NoC.

The port modulator consists of multiple code channel modulators and one code channel merger. The number K of the code channel modulators may be determined as required by an application, but cannot exceed L, i.e., K≤L. Outputs of the K code channel modulators are merged by the merger and then connected to a bus within the NoC via a port merger.

Similarly, the signal from a bus of the NoC is transmitted in parallel to the input of each code channel demodulator of a port demodulator. Likewise, the number of the code channel demodulators may be determined as required by an application, but cannot exceed L. It is assumed here that a port demodulator also includes K code channel demodulators.

Figure 3:
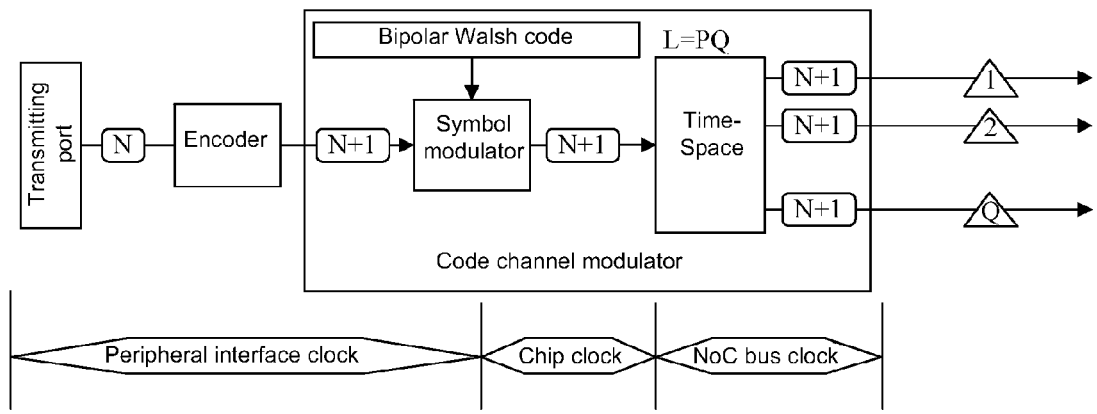
FIG. 3 is a schematic diagram of a structure of a code channel modulator according to an embodiment of the disclosure.
Figure 4:
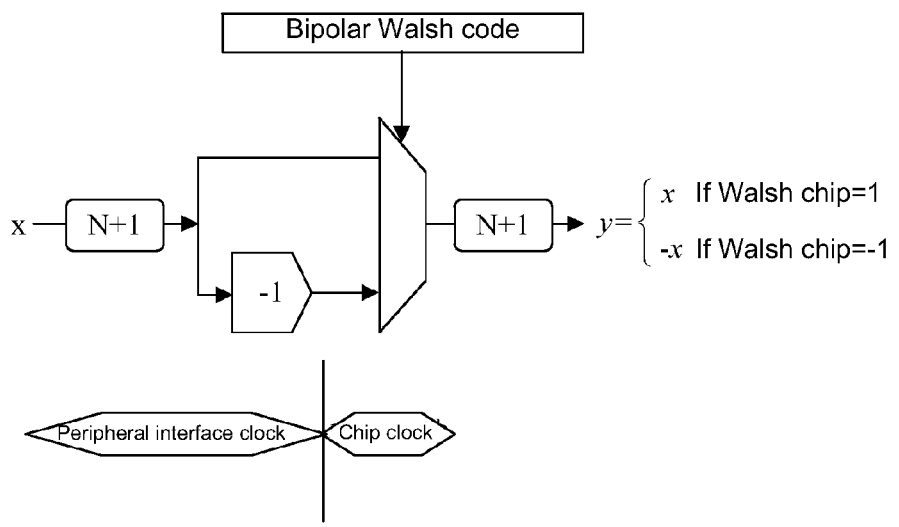
FIG. 4 is a schematic diagram of encoding according to an embodiment of the disclosure.

FIG. 3 gives the structure of each code channel modulator, N-bit data from a transmitting port are first converted into (N+1)-bit bipolar code by an encoder, with specific encoding as shown in FIG. 4. The encoding turns the N-bit input data into a bipolar data symbol for symmetric positive and negative numbers. It may be stipulated that when there is no data to be transmitted at a transmitting port, the encoder outputs are all zeros (indicating no data in the NoC). The encoded bipolar data symbol is modulated by a given bipolar Walsh code. The Walsh code will be regarded as the address of a code channel demodulator of an destination port where the data are transferred.

After being modulated, each bit of the data symbol will turn into L chips (each symbol having N+1 bits). In order to increase a transfer rate, Q chips may be transmitted in parallel, i.e., Q chips are transmitted by serial-to-parallel conversion to Q parallel output buses (each bus being of (N+1)-bit wide). After the serial-to-parallel (or time-space) conversion, L/Q clock cycles are required for complete transfer of one data symbol.

FIG. 3 further gives a concept of a clock zone; a clock zone is a peripheral clock zone; the clock is a data clock for peripheral port accessing to adjust a transmission rate of peripheral input/output data.

Another clock zone is a chip clock zone for adjusting a chip-level rate of an orthogonal code. After user data from a peripheral port are modulated by an orthogonal code, the clock will be upgraded from a peripheral data transmission clock to a chip clock.

A further clock zone is a bus clock zone within the NoC node. In order to increase data transmission capability of the NoC, a modulated user data stream is transmitted to Q parallel internal system buses for parallel transmission. When the bus clock is Rs and the chip clock is Rm, Rs=Rm/Q.

FIG. 4 gives the structure of a symbol modulator within each code channel modulator. An (N+1)-bit bipolar data symbol are divided into two streams; one of the two streams is negated; the two streams are then connected to a multiplexer; each bit of the bipolar data symbol is modulated into L chips through the multiplexer by a given Walsh code. An output of the multiplexer is taken as an input bipolar data symbol bit it self when a chip corresponding to the output is +1; otherwise an output of the multiplexer is taken as the negation of an input bipolar data symbol bit when a chip corresponding to the output is −1.

It can be seen from FIG. 4 that the input of the symbol modulator is of an external data clock; after passing through the multiplexer, the clock is upgraded to the chip clock; when the peripheral clock is Rw, Rm=LRw.

Figure 5:
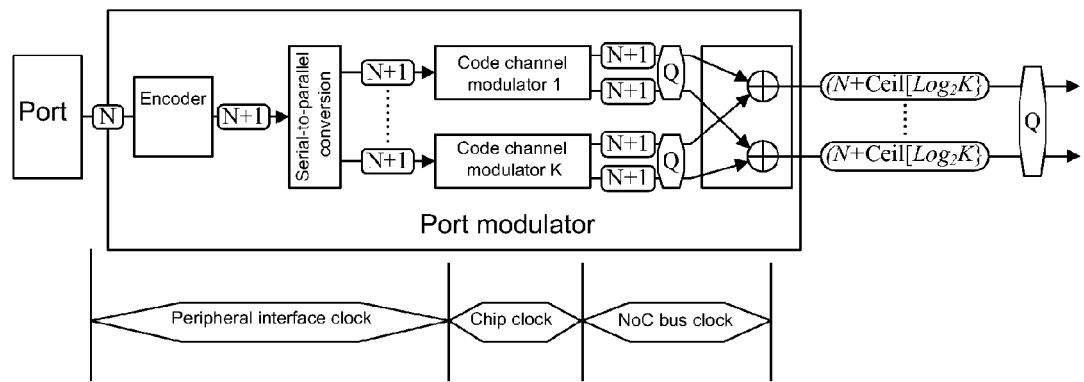
FIG. 5 is a schematic diagram of a structure of a port modulator according to an embodiment of the disclosure.

FIG. 5 gives the structure of a port modulator. Bipolar coded data are divided into K streams of data (K being the number of code channels owned by a port) through serial-to-parallel conversion, each of the K streams of data is transmitted to one code channel modulator. As described before, each code channel modulator has Q parallel outputs; K signals from the K channels are mixed by being added together by an adder. After the mixing, the bit width of each bus is extended from N+1 to N+Ceil $\{Log_2 K\}$; a mixed signal is an output of the transmitting port.

FIG. 5 also gives ranges of clock zones.

Figure 6:
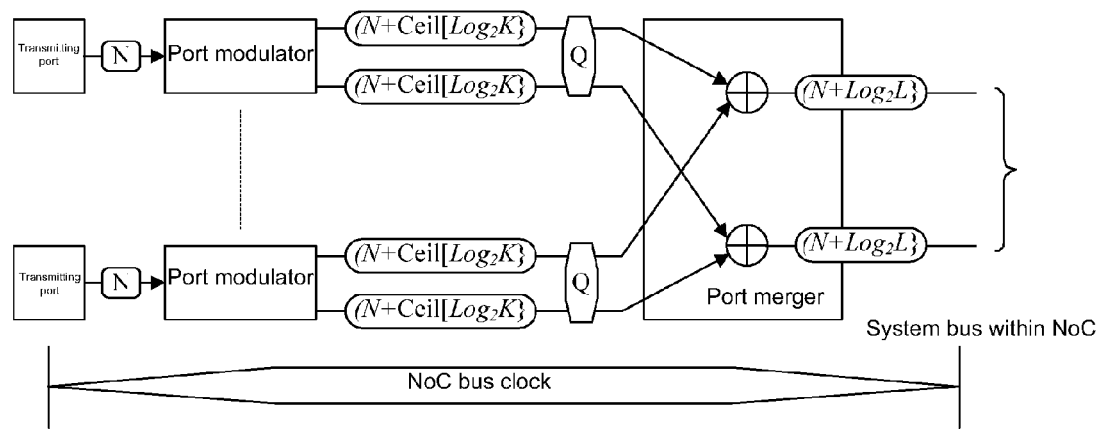
FIG. 6 is a schematic diagram of a structure of a port merger according to an embodiment of the disclosure.

FIG. 6 is a schematic diagram of a port merger. The merger is configured to mix modulated signals from all transmitting ports, transmit the mixed signal to a bus within the NoC, and to all port demodulators through the bus. Each bus connecting a transmitting port is (N+Ceil $\{Log_2 K\}$)-bit wide; after the port merger, each of Q system buses within the NoC is (N+$log_2 L$)-bit wide.

Figure 7:
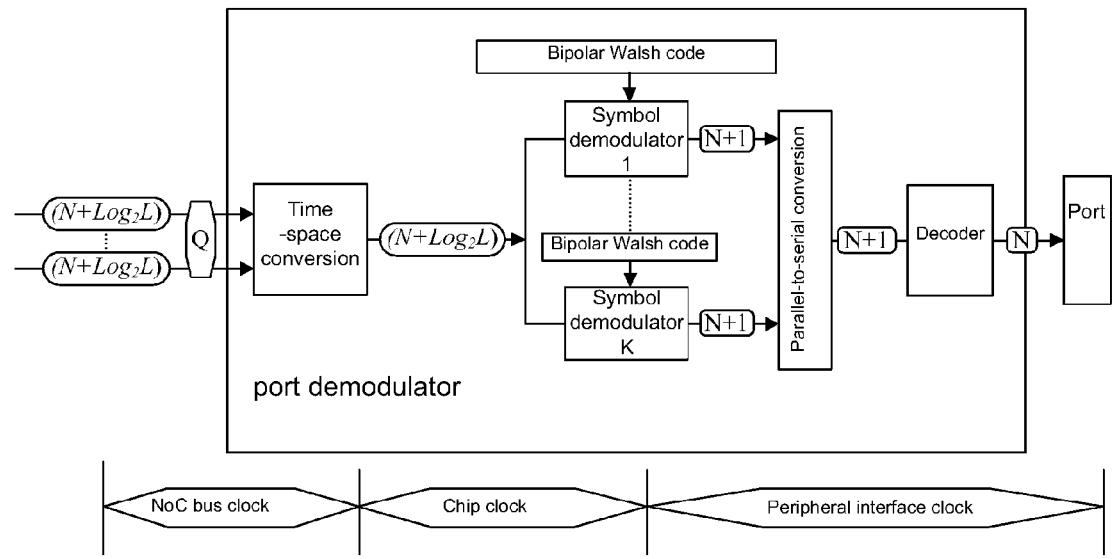
FIG. 7 is a schematic diagram of a port demodulator and clock zones.

FIG. 7 is a schematic diagram of a port demodulator and the clock zones. After the mixed signal from a system bus within the NoC is received by each port demodulator, the clock is upgraded, through parallel-to-serial (space-to-time) conversion, from a bus clock to a chip clock, i.e., Rm=QRs. Serial data after the parallel-to-serial conversion are transmitted in parallel to K code channel demodulators. Outputs of the code channel demodulators (in a peripheral user clock zone) are merged by parallel-to-serial conversion, and merged data are transmitted back to a peripheral port.

Figure 8:
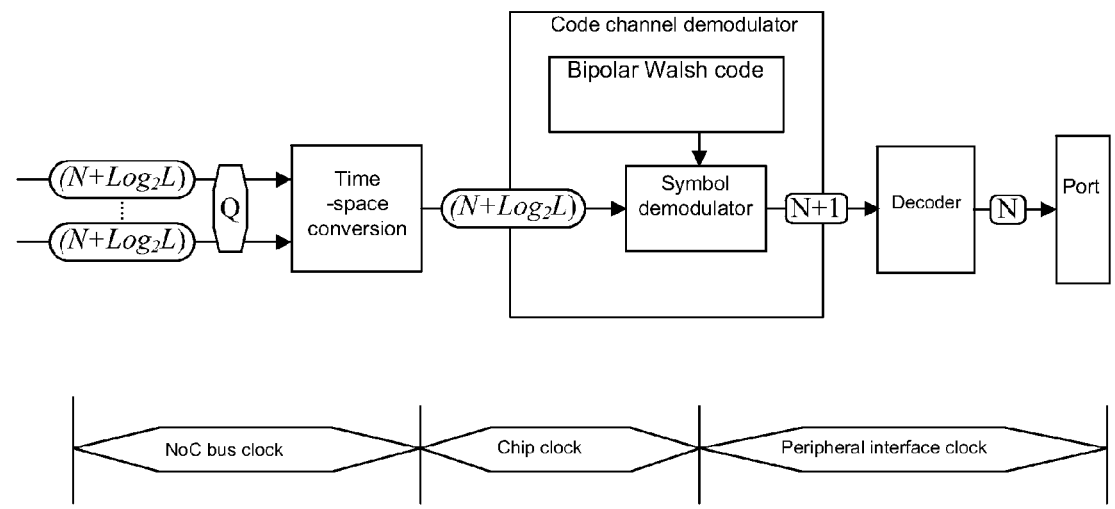
FIG. 8 is a schematic diagram of a structure of a code channel demodulator according to an embodiment of the disclosure.

FIG. 8 shows a code channel demodulator, which performs an negation operation of the code channel modulator. After the mixed signal from system buses within the NoC passes through the code channel demodulator, a clock of user data with the orthogonal code removed is a peripheral clock.

Figure 9:
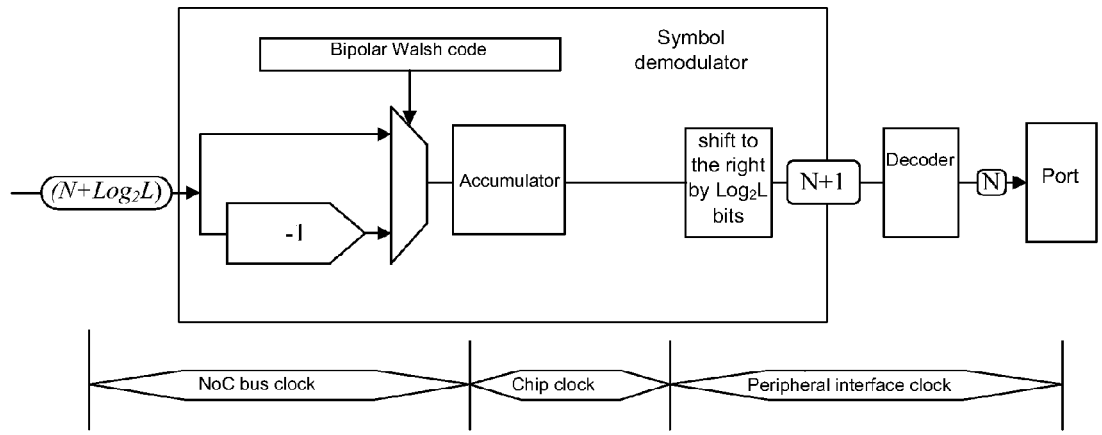
FIG. 9 is a schematic diagram of a structure of a symbol demodulator according to an embodiment of the disclosure.

FIG. 9 gives the structure of each symbol demodulator. Similar to a symbol modulator, an input signal is divided into two signals; one of the two signals is negated; the two signals are transmitted to an accumulator through a multiplexer controlled by an orthogonal code; the accumulator accumulates L chips corresponding to one bit of user data; and then the bit of the user data is restored by dividing a result of the accumulation by L, i.e., comparable to de-spreading in CDMA. The clock of de-spread user data will be recovered from the chip clock before the de-spreading to the data clock of a peripheral port.

Figure 10:
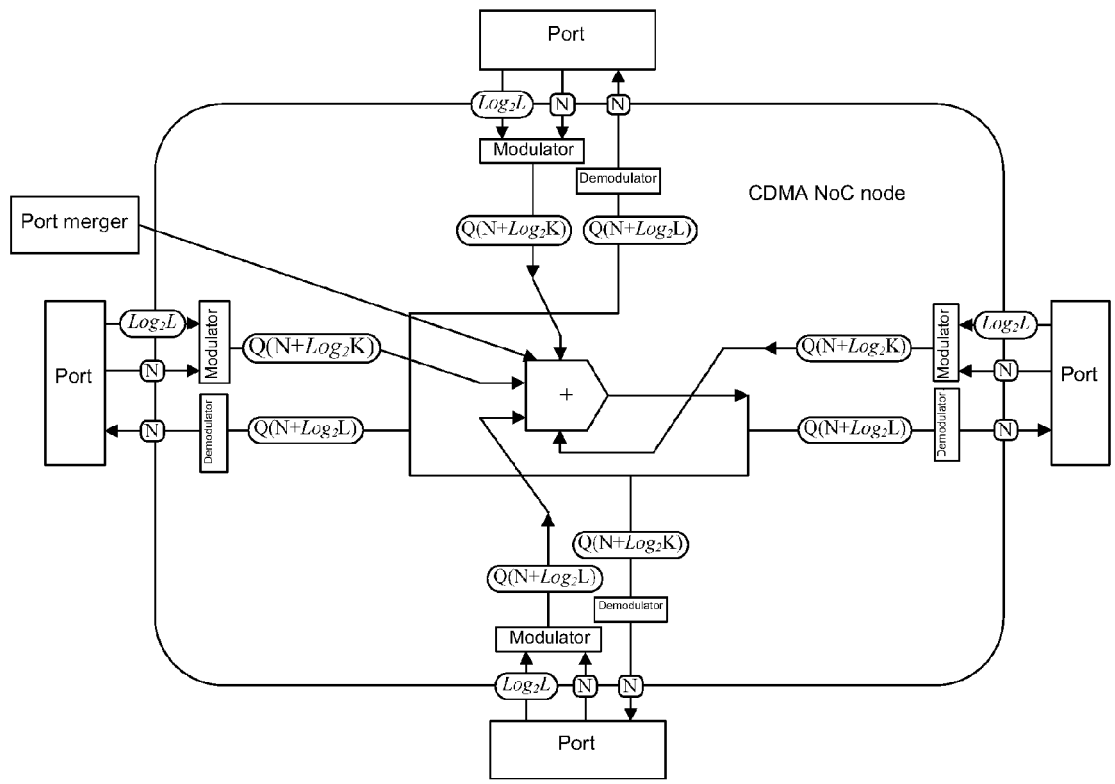
FIG. 10 is a schematic diagram of widths of buses of an NoC according to an embodiment of the disclosure.

FIG. 10 gives widths of buses of the NoC. It can be seen from the figure that for each transmitting port there are two buses for input to the NoC, one is an N-bit wide data bus, and the other is an ($Log_2L$)-bit wide address bus. The address bus gives a destination address of data to be transmitted, and the destination address is a pointer to a Walsh code of the modulator. the N-bit wide data pass through the code channel modulators and the code channel merger, and are output to a port merger by Q buses each having a bit width of $N+Log_2K$. Merging of signals from all ports in the port merger produces a mixed signal with a bit width of $N+log_2L$, and the mixed signal is transmitted in parallel to Q system buses within the NoC. The Q system buses transmit (such as by broadcast) the mixed signal to all port demodulators. A demodulated signal is restored to N-bit data identifiable by a peripheral port. A code channel demodulator in each port demodulator has an orthogonal code which can be dynamically reset, and the orthogonal code is the address code of the code channel. Data modulated by the orthogonal code included in the mixed signal on a system bus will be demodulated by a code channel demodulator with the orthogonal code as the address code, and will be transmitted to a receiving port connected to the code channel demodulator.

As an embodiment, Table 1 is a bipolar data encoding table, in which the bit width of data of a peripheral port is 3, and the data are extended to 4 bits after bipolar encoding. Zeros in all 4 bits in the table indicate no data transmission. Similarly, it will be easy to give bipolar encoding of data with any bit width, details of which will not be repeated.

TABLE 1

| Data on a port bus | Format of converted data (requiring 4 bits) | remark |
| --- | --- | --- |
| 0 (000) | −7 (1001) | |
| 1 (001) | −5 (1011) | |
| 2 (010) | −3 (1101) | |
| 3 (011) | −1 (1111) | |
| 4 (100) | 1 (0001) | |
| 5 (101) | 3 (0011) | |
| 6 (110) | 5 (0101) | |
| 7 (111) | 7 (0111) | |
| No data transmission | 0 (0000) | If a port stops transmitting data, a port modulator will transmit 0000 |

Figure 11:
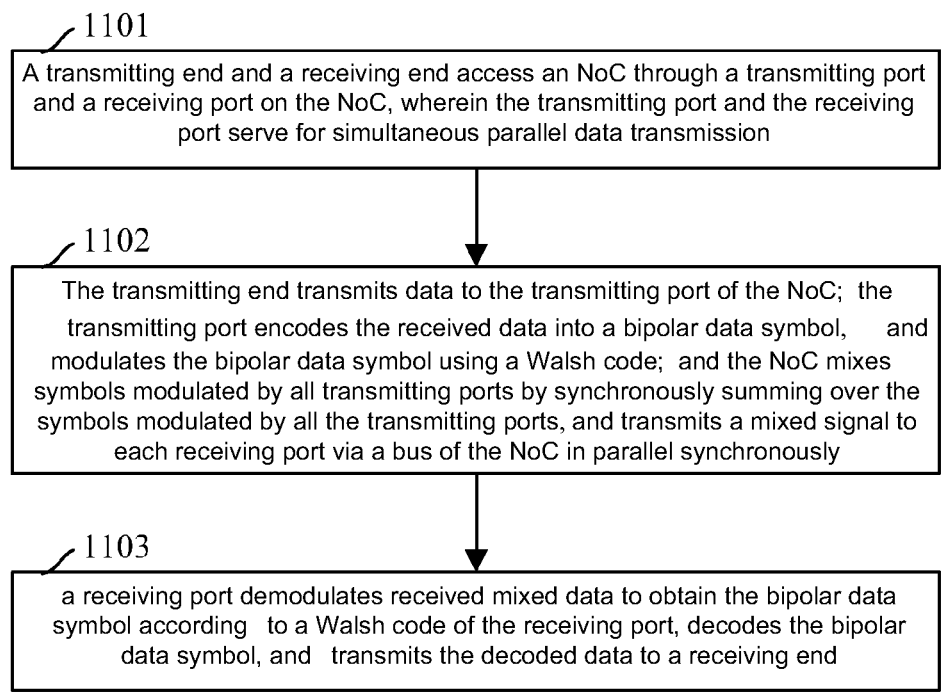
FIG. 11 is a flowchart of implementing synchronous parallel transmission over multiple channels according to an embodiment of the disclosure.

It can be seen from the above description that implementation of synchronous parallel transmission over multiple channels according to the disclosure may be indicated by a flow as shown in FIG. 11, including steps as follows.

In Step 1101, a transmitting end and a receiving end access an NoC through a transmitting port and a receiving port on the NoC, wherein the transmitting port and the receiving port serve for simultaneous parallel data transmission.

In Step 1102, the transmitting end transmits data to the transmitting port of the NoC; the transmitting port encodes the received data into a bipolar data symbol, and modulates the bipolar data symbol using a Walsh code; and the NoC mixes symbols modulated by all transmitting ports by synchronously summing over the symbols modulated by all the transmitting ports, and transmits a mixed signal to each receiving port via a bus of the NoC in parallel synchronously.

In Step 1103, a receiving port demodulates received mixed data to obtain the bipolar data symbol according to a Walsh code of the receiving port, decodes the bipolar data symbol, and transmits the decoded data to a receiving end.

To sum up, a solution for implementing synchronous parallel transmission over multiple channels in both the method and the system according to the disclosure is advantageous in that:

cores belonging to two different clusters on a same network are isolated from each other completely;

communications among all cores within a same cluster are performed in parallel synchronously completely, i.e., with synchronous parallel transmission over multiple channels; and transmission delay of each channel is identical; and dynamic reconfiguration is implemented, i.e., each NoC port can be dynamically allocated with one or more channels to adapt to different requirements on a communication bandwidth.

What described are merely embodiments of the disclosure, and are not intended to limit the scope of the disclosure.

The invention claimed is:

1. A method for implementing synchronous parallel transmission over multiple channels, comprising:

accessing, by a transmitting end and a receiving end, a Network on Chip (NoC) through a transmitting port and a receiving port on the NoC, wherein the transmitting port and the receiving port serve for simultaneous parallel data transmission;

transmitting, by the transmitting end, data to the transmitting port of the NoC; encoding, by the transmitting port, the received data into a bipolar data symbol, and modulating the bipolar data symbol using a Walsh code; and mixing, by the NoC, symbols modulated by all transmitting ports by synchronously summing over the symbols modulated by all the transmitting ports, and transmitting a mixed signal to each receiving port via a bus of the NoC in parallel synchronously;

demodulating, by a receiving port, received mixed data to obtain the bipolar data symbol according to a Walsh code of the receiving port, decoding the bipolar data symbol, and transmitting the decoded data to a receiving end, wherein when transmitting data, a transmitting end transmits N-bit wide binary data to a port modulator of the NoC; and a receiving port receives N-bit wide binary data from a receiving end;

the port modulator includes K code channel modulators; and outputs of the K code channel modulators of the port modulator are merged and then connected to a bus within the NoC via a port merger;

the signal from a bus of the NoC is transmitted in parallel to K code channel demodulators of a port demodulator of the NoC, and data demodulated by the K code channel demodulators are synthesized into one stream of data by parallel-to-serial conversion, wherein each of the code channel modulators converts the N-bit data from a transmitting end into an (N+1)-bit bipolar data symbol through an encoder, and modulates the (N+1)-bit bipolar data symbol by a given bipolar Walsh code, such that the modulation turns each bit of the bipolar data symbol into L chips; and then Q chips of the L chips are transmitted in parallel.

2. The method according to claim 1, wherein in modulation of the (N+1)-bit bipolar data symbol, a symbol modulator in a code channel modulator divides the (N+1)-bit bipolar data symbol into two streams, negates one of the two streams, and then connects the two streams to a multiplexer; each bit of the bipolar data symbol is modulated into L chips through the multiplexer by a given Walsh code; an output of the multiplexer is taken as an input bipolar data symbol bit it self when a chip corresponding to the output is +1, or otherwise an output of the multiplexer is taken as the negation of an input bipolar data symbol bit when a chip corresponding to the output is −1.

3. The method according to claim 1, wherein when the outputs of the K code channel modulators of the port modulator are merged and then connected to a bus within the NoC via the port merger, the port merger mixes modulated signals from all the transmitting ports, transmits the mixed signal to a bus within the NoC, and to all port demodulators via the bus.

4. The method according to claim 1, wherein
when receiving the signal from a bus of the NoC, a code channel demodulator performs a negation operation of the code channel demodulator;
after the mixed signal from a system bus within the NoC passes through the code channel demodulator, a clock of user data with the orthogonal code removed is a peripheral clock.

5. The method according to claim 2, wherein a symbol demodulator in a code channel modulator divides an input signal into two signals, negates one of the two signals, transmits the two signals to an accumulator through a multiplexer controlled by an orthogonal code, triggers accumulation of L chips corresponding to one bit of user data by the accumulator, and then restores the bit of the user data by dividing a result of the accumulation by L.

6. The method according to claim 1, wherein the Walsh code is uniquely specified by a destination address of the transmitting port, and each receiving port is specified by a unique Walsh code.

7. The method according to claim 2, wherein
when receiving the signal from a bus of the NoC, a code channel demodulator performs a negation operation of the code channel demodulator;
after the mixed signal from a system bus within the NoC passes through the code channel demodulator, a clock of user data with the orthogonal code removed is a peripheral clock.

8. A system for implementing synchronous parallel transmission over multiple channels, comprising a Network on Chip (NoC) configured with a transmitting port and a receiving port serving for simultaneous parallel data transmission, wherein
the transmitting port and the receiving port are configured for access of the NoC by a transmitting end and a receiving end;
the transmitting port is configured to receive data transmitted by the transmitting end to the NoC, encode the received data into a bipolar data symbol, and modulate the bipolar data symbols using a Walsh code;
the NoC is configured to mix symbols modulated by all transmitting ports by synchronously summing over the symbols modulated by all the transmitting ports, and transmit a mixed signal to each receiving port via a bus of the NoC in parallel synchronously; and
a receiving port is configured to demodulate received mixed data to obtain the bipolar data symbol according to a Walsh code of the receiving port, decode the bipolar data symbol, and transmit the decoded data to a receiving end,
wherein a transmitting end is configured to: when transmitting data, transmit N-bit wide binary data to a port modulator of the NoC; and a receiving port is configured to receive N-bit wide binary data from a receiving end;
the port modulator includes K code channel modulators; and outputs of the K code channel modulators of the port modulator are merged and then connected to a bus within the NoC via a port merger;
the signal from a bus of the NoC is transmitted in parallel to K code channel demodulators of a port demodulator of the NoC, and data demodulated by the K code channel demodulators are synthesized into one stream of data by parallel-to-serial conversion,
wherein each of the code channel modulators is configured to convert the N-bit data from a transmitting end into an (N+1)-bit bipolar data symbol through an encoder, and modulate the (N+1)-bit bipolar data symbol by a given bipolar Walsh code, such that the modulation turns each bit of the bipolar data symbol into L chips, wherein Q chips of the L chips are then transmitted in parallel.

9. The system according to claim 8, wherein each code channel modulator includes a symbol modulator configured to: in modulation of the (N+1)-bit bipolar data symbol, divide the (N+1)-bit bipolar data symbol into two streams, negate one of the two streams, connect the two streams to a multiplexer to modulate each bit of the bipolar data symbol into L chips through the multiplexer by a given Walsh code, wherein an output of the multiplexer is taken as an input bipolar data symbol bit it self when a chip corresponding to the output is +1, or otherwise an output of the multiplexer is taken as the negation of an input bipolar data symbol bit when a chip corresponding to the output is −1.

10. The system according to claim 8, wherein the port merger is configured to: when the outputs of the K code channel modulators of the port modulator are merged and then connected to a bus within the NoC via the port merger, mix modulated signals from all the transmitting ports, transmit the mixed signal to a bus within the NoC, and to all port demodulators via the bus.

11. The system according to claim 8, wherein
a code channel demodulator is configured to: when receiving the signal from a bus of the NoC, perform a negation operation of the code channel demodulator, wherein
after the mixed signal from a system bus within the NoC passes through the code channel demodulator, a clock of user data with the orthogonal code removed is a peripheral clock.

12. The system according to claim 9, wherein each code channel modulator includes a symbol demodulator configured to divide an input signal into two signals, negate one of the two signals, transmit the two signals to an accumulator through a multiplexer controlled by an orthogonal code, trigger accumulation of L chips corresponding to one bit of user data by the accumulator, and then restore the bit of the user data by dividing a result of the accumulation by L.

13. The system according to claim 8, wherein the Walsh code is uniquely specified by a destination address of the transmitting port, and each receiving port is specified by a unique Walsh code.

14. The system according to claim 9, wherein
a code channel demodulator is configured to: when receiving the signal from a bus of the NoC, perform a negation operation of the code channel demodulator, wherein after the mixed signal from a system bus within the NoC passes through the code channel demodulator, a clock of user data with the orthogonal code removed is a peripheral clock.

* * * * *